(12) United States Patent
Lianza et al.

(10) Patent No.: US 7,499,163 B2
(45) Date of Patent: Mar. 3, 2009

(54) SYSTEM AND METHOD FOR APPLYING CORRECTION FACTORS RELATED TO AMBIENT CONDITIONS

(75) Inventors: Thomas A. Lianza, Bedford, NH (US); Richard A. Federico, Reading, MA (US); Carl D. Lutz, Auburn, NH (US)

(73) Assignee: X-Rite Europe GmbH, Regensdorf (CH)

( * ) Notice: Subject to any disclaimer, the term of this patent is extended or adjusted under 35 U.S.C. 154(b) by 401 days.

(21) Appl. No.: 11/352,592

(22) Filed: Feb. 13, 2006

(65) Prior Publication Data

US 2006/0195278 A1 Aug. 31, 2006

Related U.S. Application Data

(60) Provisional application No. 60/653,048, filed on Feb. 15, 2005.

(51) Int. Cl.
*G01J 3/46* (2006.01)
(52) U.S. Cl. .................. 356/402; 356/425; 356/405
(58) Field of Classification Search ............... 356/402, 356/405, 425; 345/690, 22; 348/602
See application file for complete search history.

(56) References Cited

U.S. PATENT DOCUMENTS

| | | | |
|---|---|---|---|
| 3,675,984 A | | 7/1972 | Vulmiere et al. |
| 4,632,559 A | | 12/1986 | Brunsting |
| 4,707,138 A | | 11/1987 | Coatney |
| 5,406,305 A | | 4/1995 | Shimomura et al. |
| 5,479,186 A | * | 12/1995 | McManus et al. ............. 345/11 |
| 5,510,851 A | * | 4/1996 | Foley et al. ................. 348/658 |

(Continued)

FOREIGN PATENT DOCUMENTS

EP 0495569 7/1992

(Continued)

OTHER PUBLICATIONS

Partial European Search Report dated Sep. 28, 2006.

(Continued)

*Primary Examiner*—L. G Lauchman
(74) *Attorney, Agent, or Firm*—McCarter & English, LLP

(57) ABSTRACT

A method and system for effecting an appearance model correction for a display unit, e.g., a CRT, using a polynomial-based algorithm is described. The correction may be effected in real time and is based on gamma values associated with the display. Strong correlations with the CIECAM02 specification are achieved according to the present disclosure. The correction functionality may be implemented using a colorimeter that includes a plurality of sensors/filter systems with non overlappng spectral responses, adequate for providing data capable of translation into standard coordinates system such as, CIE XYZ, CIE L*a*b*, or CIE Luv, as well as non-standard operable coordinate systems. The field of view of the colorimeter is chosen to closely track the response of the human eye using an optical path configured to select and limit the field of view in a manner that is insensitive to placement of the colorimeter on the source image. The optical path from the source image to the sensor is configured to select preferred light rays while rejecting undesirable light rays to maximize the signal/noise ratio. A rearward facing sensor channel is included to simultaneously measure ambient light impinging on the source image and feedback means to provide status and/or change of information.

25 Claims, 13 Drawing Sheets

U.S. PATENT DOCUMENTS

| | | | | |
|---|---|---|---|---|
| 5,657,079 | A | * | 8/1997 | Thario et al. ............... 348/190 |
| 5,892,585 | A | | 4/1999 | Lianza et al. |
| 6,459,425 | B1 | * | 10/2002 | Holub et al. ............... 345/207 |
| 6,459,485 | B1 | | 10/2002 | Tsurutani |
| 6,505,775 | B1 | | 1/2003 | Gu et al. |
| 6,784,995 | B2 | * | 8/2004 | Merle et al. ............... 356/402 |
| 6,862,029 | B1 | * | 3/2005 | D'Souza et al. ............ 345/690 |
| 2002/0126286 | A1 | | 9/2002 | Melnyk et al. |
| 2002/0159065 | A1 | | 10/2002 | Berstis |
| 2003/0058202 | A1 | * | 3/2003 | Evanicky et al. ............ 345/82 |
| 2004/0075032 | A1 | | 4/2004 | Lutz |
| 2004/0080749 | A1 | | 4/2004 | Lutz et al. |
| 2004/0104883 | A1 | | 6/2004 | Drader |
| 2004/0114144 | A1 | | 6/2004 | Lutz et al. |

FOREIGN PATENT DOCUMENTS

EP     1233610     8/2002

OTHER PUBLICATIONS

European Search Report dated Jun. 20, 2006.

* cited by examiner

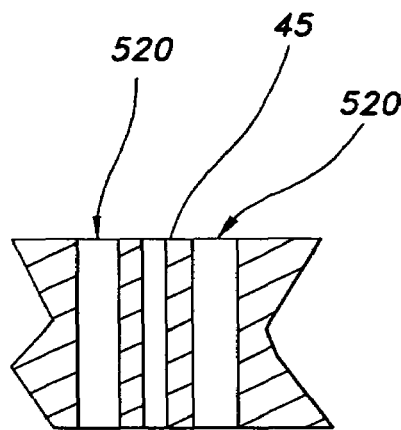
FIG. 6
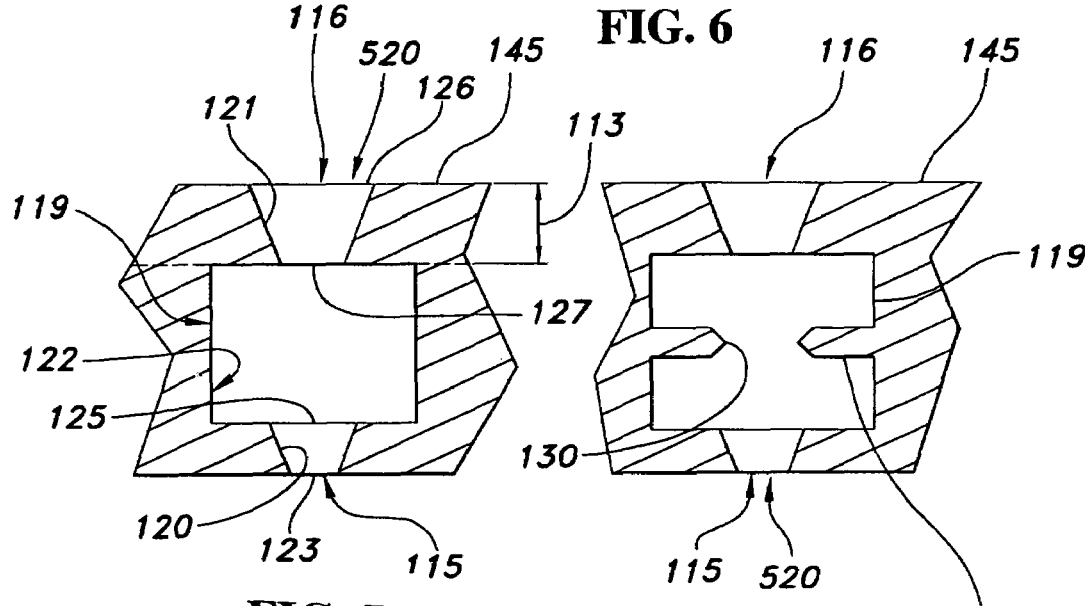
FIG. 7
FIG. 8
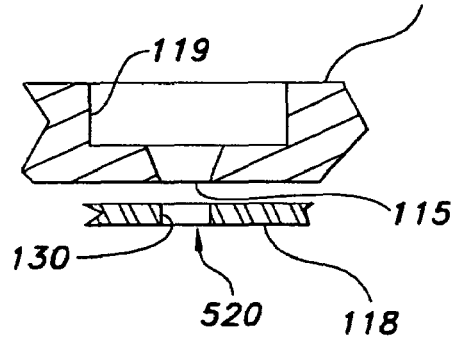
FIG. 9

SYSTEM AND METHOD FOR APPLYING CORRECTION FACTORS RELATED TO AMBIENT CONDITIONS

CROSS-REFERENCE TO RELATED APPLICATION(S)

The present application claims the benefit of a co-pending, commonly assigned provisional patent application entitled "Improved Colorimetry by Proper Handling of Ambient Light," which was filed on Feb. 15, 2005 and assigned Ser. No. 60/653,048. In addition, the present application claims the benefit of a co-pending, commonly assigned non-provisional patent application entitled "Method and Apparatus for Improved Colorimetry," which was filed on Sep. 30, 2005 and assigned Ser. No. 11/240,917. The entire contents of the foregoing provisional patent application and non-provisional patent application are hereby incorporated herein by reference.

BACKGROUND

1. Technical Field

The present disclosure relates to systems and methods for applying correction factors related to display systems and, more particularly, to a colorimeter that is programmed through software and/or hardware to calculate and apply one or more correction factors to compensate for ambient conditions. Exemplary colorimeters according to the present disclosure include an optical geometry and assembly that provides a high signal-to-noise ratio (SNR).

2. Background Art

Colorimeters are accurate devices for measuring the spectral content of light emitted either directly or indirectly from a given source. Standards bodies such as the Video Electronics Standards Association (VESA) have been a driving force behind the development of colorimeter performance. The VESA 1.0 standard, for example, is primarily directed to specifying measurement of contrast ratio, and is limited to a no greater than +/−2 degree viewing angle from the source to the sensor.

However, typical devices being measured, such as computer displays, are actually viewed from much greater angles than specified in the standards. To further exacerbate this situation, the degradation of spectral parameters that occurs with increased viewing angle, does not occur equally for all colors. Such incompatibilities have yet to be resolved or otherwise addressed. In addition, early devices developed under the standards were relatively costly. Such devices typically employ highly accurate measurement optics. Apertures have frequently been used in conjunction with lenses or other precision optical elements. Typical colorimeter configurations include a light sensing diode, and an integral lens that directs light to the sensor area.

More recent developments have produced designs resulting in low cost colorimeters with performance characteristics approaching or exceeding professional quality required by the standards. Such newer designs generally employ basic aperture geometry, and either non-overlapping or overlapping spectral ranges/filters. One such design uses a unique aperture plate that has oblong holes, and is spaced between the target surface and the filter/sensor set. The resulting field of view is about +−15 degrees or more on each axis.

However, such a design does not correspond to the field of view of the human eye. Rather, it is about four times too large. Also, the position of the aperture plate is spaced from the target surface by a mounting distance that is typically defined by one to four relatively large suction cups (i.e., one at each corner of the colorimeter housing). Such designs generally cause variations in the mounting distance due to leaking-based relaxation of the suction cups. This variation, in conjunction with a fixed-distance between the aperture plate and the sensor, causes the field of view to vary as well, and adversely impacts the accuracy of the associated measurements.

In addition, colorimeter designs generally require alignment of the sensor to one or more optical paths. This alignment is typically provided by a secondary reference surface on the sensor diode. However, this sensor reference does not assure accurate alignment of the sensor in the plane parallel to the measured surface, and there is no means for locating the center of the senor lens to the center of the optical path. Such limitations contribute to undesirable decay of the SNR, as well as to inadequate color measurement accuracy.

While prior art colorimeters concentrated on measurement of what the sensor "sees", effects on perception resulting from ambient light impinging upon the source has eluded the existing colorimeter art. Colorimeter performance can be greatly degraded by ambient light effects of: 1) image perception of the human eye in the presence of varying ambient conditions, 2) ambient light reflected from the display screen integrated with the display screen image source, 3) flare, and other factors.

A metaphoric example of the types of perceived changes in "viewed monitor" systems in the presence of changing ambient light conditions follows below. When viewing automotive headlights in the daylight, they appear yellowish and dim. However, when viewing the headlights at night, they appear bright and white or blue white. This example highlights how important it is to calibrate for ambient light conditions in order to get results that maintain consistent appearance in a viewing system.

In general, viewing a screen in dim ambient conditions leads to a perception of less color and lower contrast. If this in turn leads to arbitrary adjustment of the brightness control (when available such as with analog displays), system calibration can be severely hampered.

In the photometric field, the terms "luminance" and "illuminance" are of principal importance in addressing ambient light effects. "Luminance" characterizes the amount of visible energy that a source of known characteristics is capable of generating into a known solid angle. "Illuminance" is the amount of visible energy that strikes an object per unit area of the object. Once light strikes the object, the light is reflected off the object. The illuminated object may then be considered another source, hence "illumination" leads to "luminance." The SI unit for "illuminance" is "Lux" and the SI unit for "luminance" is a "candela" or "nit" (one candela per square meter).

The following Table 1 provides representative illuminance and luminance values for typical environments and/or conditions.

TABLE 1

| Description | Low Illum. (lux) | High Illum. (lux) | Low Lum. (nits) | High Lum. (nits) |
| --- | --- | --- | --- | --- |
| Bright sun | 50,000 | 100,000 | 3,000 | 6,000 |
| Cloudy Bright | 10,000 | 25,000 | 600 | 1500 |
| Office (high) | 300 | 500 | 18 | 30 |
| Office (normal) | 200 | 300 | 12 | 18 |
| Home living room | 50 | 200 | 3 | 12 |

The above-noted luminance data is based on an "average scene" which is taken to be 20% of the illuminating source luminance. A typical display device used in a commercial environment is capable of producing a working white luminance of at least 100 cd/m². Using the "average scene" rule of thumb, such a display yields approximately 20 cd/m². With further reference to Table 1, the average CRT luminance falls in the middle of the average scene luminance for typical office environments, which helps to explain why commercial display devices such as CRTs and LCDs are generally acceptable in a work place with moderate lighting. Moreover, the increased luminance of modern LCDs allows for comfortable viewing in well lit offices. The person working in the office is viewing the display at nominally the same level of adaptation as he/she views the rest of the work place.

Table 2 sets forth display conditions and measured illuminance associated with four typical environments:

TABLE 2

| Display Condition | Bright Office | Normal Office | Home Living | Dark Viewing |
|---|---|---|---|---|
| Illuminance | 300->500 | 200->300 | 50->300 | <50 |

A desired attribute in the colorimeter art is the ability to anticipate the effects of ambient light on the source as perceived by the viewer and to correct for such effects. Brightness controls on displays are notoriously non-linear. Uncalled for adjustment of brightness by the user can introduce severe degradation of contrast, linearity and perceived anomalies. Further image contrast and the ability to discern detail at different levels of image luminosity can be adversely affected by ambient illuminance of the area immediately adjacent to the image.

In one instance known to the inventors, a product distributor, LaCie, adapts only for intensity of ambient light, ignoring colorimetric content. However, this solution also requires that the sensor be reversed to make the ambient reading. While it has been recognized that ambient light presents many problems and challenges to colorimeter measurement quality, to date the most sophisticated approaches are limited to taking a reading of the ambient at a point, and then depending on that measurement of ambient light for all ensuing ambient light compensation. Typically this is accomplished by turning the colorimeter away from the source image to take a reading of the ambient light. In some instances a diffuser is placed on the colorimeter to improve the specific and single measurement.

Previously disclosed embodiments of a colorimeter by the assignee of the present application measured ambient light by removing the colorimeter body from the image source screen, placing a diffuser on the viewing surface of the colorimeter, and orienting the combination away from the screen to get a reading estimate of the ambient light.

Nonlinearities of displays, complexity of color measurement, response of the human eye, effects of viewing room ambient conditions, measurement degradation due to extraneous other factors, and the interactions between these factors make measurement and compensation challenging at the least. It is desired to maximize the S/N (signal/noise ratio) by controlling the ambient light effects within the system such as: flare, reflected light, extraneous light rays impinging on the sensor and numerous other sources of light impinging on the sensor that are not primary source generated rays. Therefore, a colorimeter is desired that takes into account the effects of ambient light impinging on the source image (LCD, CRT screen, etc.).

Further, there is a desire for making the colorimeter measurements agree more with the ambient light that impinges on the source image and reading the ambient light on an ongoing basis to make important corrections in a varying ambient light environment. It is further recognized that it would be a desirable feature of a colorimeter to be able to alert the user to real time changes in ambient viewing light that are deemed sufficient to effect the perceived attributes of the image.

SUMMARY OF THE DISCLOSURE

The present disclosure provides advantageous systems and methods for applying correction factors related to display systems and, more particularly, to a colorimeter that is programmed through software and/or hardware to calculate and apply one or more correction factors to compensate for ambient conditions. The disclosed correction system and methodology streamlines the calculations associated with the C.I.E. Color Appearance Model specification, i.e., the CIECAM02 specification, such that ambient condition corrections may be implemented on an expeditious, real-time basis, without the need for substantial processing infrastructure. Despite the streamlined nature of the disclosed correction system and methodology, the systems and methods of the present disclosure achieve excellent correlation relative to the CIECAM02 specification across a broad range of ambient conditions.

More particularly, the disclosed correction system and methodology employs a polynomial correction factor that represents an abstraction from the multi-variable CIECAM02 specification and that advantageously correlates with eye adaptation issues associated with ambient conditions. According to the present disclosure, it has been determined that an appropriate correction factor may be derived based on a single variable, i.e., the effective "gamma" for the relevant display. As is known in the art, the inherent nonlinearity of a display, e.g., a CRT, is generally referred to as the "gamma" and gamma correction is generally required to account for such nonlinearity.

Thus, according to exemplary embodiments of the present disclosure, an appropriate color appearance model is achieved through a polynomial-based correction algorithm that generates gamma correction coefficients to correct a display appearance based on illuminance levels, i.e., over a range of illumination levels. The disclosed polynomial-based correction algorithm has demonstrated excellent correlation with data collected from CIECAM02 modeling of data for a range of illumination conditions, e.g., dark, dim and light conditions. Implementation of the disclosed polynomial-based algorithm is generally achieved through appropriate software programming, e.g., firmware, associated with a colorimeter or other color measurement system or a hardware-based implementation. The polynomial-based algorithm is generally run on a processing unit associated with the colorimeter, although alternative implementations may be employed, e.g., network-based processing. The gamma correction factors generated by the disclosed polynomial-based algorithm are applied to a display, e.g., an LCD, to provide enhanced viewing of the display based on existing ambient conditions.

According to exemplary embodiments of the present disclosure, the polynomial-based algorithm is employed with a colorimeter that is designed to maximize the signal-to-noise ratio and to sense light emitted from a target surface by matching the colorimeter's field of view to that of the human eye for devices that measure target surfaces (e.g., displays, CRT's, LCD's, printed, and pictorial materials), commonly viewed by humans. Accordingly, in an exemplary embodiment of the present disclosure, a color sensing device for sensing light emitting from a target surface includes a chamber block having at least three overlapping spectral light passages extending through the chamber block configured to select a preferred field of view between the target surface and a corresponding sensor adapted to detect light from the target surface. Each light passage is configured having an entry orifice, exit orifice and an intermediate chamber. The entry orifice faces the target surface and is defined with an entry wall defining an entrance for emitted light from the target surface into the light passage. The exit orifice faces the sensor and is defined with an exit wall defining an exit for the emitted light from the light passage. The chamber intermediate the entry and exit walls is defined by a chamber wall having a diameter larger than a diameter of the entry and exit walls.

In another exemplary embodiment of the present disclosure, a color sensing device for sensing light emitting from a target surface includes three or more light sensors. Each sensor is configured to detect light from the target surface. The device includes a sensor locating element having three or more light passages and corresponding alignment features. Each alignment feature is adapted to receive a locating feature of a corresponding sensor, thereby aligning each sensor with a corresponding light passage. The device also includes a chamber block operatively coupled in alignment with the sensor locating element. The chamber block has three or more filter cavities and corresponding light passages. Each light passage is in alignment with a corresponding light passage of the sensor locating element. Each light passage is configured having an entry orifice, exit orifice and an intermediate chamber. The entry orifice faces the target surface and is defined with an entry wall defining an entrance for emitted light from the target surface into the light passage. The exit orifice faces the sensor and is defined with an exit wall defining an exit for the emitted light from the light passage. The chamber intermediate the entry and exit walls is defined by a chamber wall having a diameter larger than a diameter of the entry and exit walls. Exemplary embodiments of the device also include three or more distinct light filter stacks including one or more filter elements. Each filter stack is placed in a corresponding one of the filter cavities, thereby providing three or more overlapping spectrally selective channels, with each spectrally selective channel designed to provide a pre-defined field of view between the target surface and a corresponding one of the light sensors.

In another exemplary embodiment of the present disclosure, a color sensing device for sensing light emitting from a target surface includes a first housing; three or more light sensors disposed with the first housing and facing the target surface; a chamber block having at least three spectral light passages extending through the chamber block configured to select a preferred field of view between the target surface and a corresponding light sensor adapted to detect light from the target surface; and an ambient light sensor disposed at or within the first housing facing ambient light impinging the target surface without the need to reorient the first housing relative to the target surface. The ambient sensor continuously reads the impinging light while the three or more light sensors simultaneously read the light attributes emanating from the target surface.

In another exemplary embodiment of the present disclosure, a method for simultaneously measuring ambient light illumination impinging on a target surface and attributes of the luminance emanating from the target surface, with correction thereof, is disclosed. The method includes reading luminance from the target surface using three or more light sensors disposed with a first housing and facing the target surface, each sensor configured with a lens and adapted to detect light from the target surface; and reading ambient light impinging on the target surface using an ambient light sensor disposed at or within the first housing facing ambient light impinging the target surface without the need to reorient the first housing relative to the target surface. The ambient sensor continuously reads the impinging light while the three or more light sensors simultaneously read the light attributes emanating from the target surface. A polynomial-based algorithm is employed to generate gamma correction factors for use in correcting the appearance of the display based on ambient conditions.

Additional advantageous features and functions associated with the disclosed system, apparatus and method will be apparent from the detailed description which follows, particularly when viewed in conjunction with the appended figures.

BRIEF DESCRIPTION OF THE DRAWINGS

So that those of ordinary skill in the art to which the subject disclosure pertains will more readily understand how to make and use the systems, apparatus and methods described herein, aspects of exemplary embodiments of the present disclosure will be described in detail with reference to the drawings, wherein:

FIG. 6 is a partial cross section view of the prior art tube block of FIG. 5;

FIG. 7 is a partial cross section view of a chamber block replacing the tube block of FIG. 5, the chamber block illustrating a chamber and corresponding entry and exit orifices in accordance with the present disclosure;

FIG. 8 is another cross section view of the chamber block of FIG. 7, including an internal baffle disposed in the chamber according to the present disclosure;

FIG. 9 is another cross section view of the chamber block of FIG. 7, including an external baffle disposed outside the chamber block and proximate the entry orifice according to the present disclosure;

DETAILED DESCRIPTION OF EXEMPLARY EMBODIMENT(S)

Embodiments of the present disclosure provide colorimeters capable of measurement of emitted light from sources that are static, such as LCD displays, illuminated printed or graphic matter, and/or temporally active sources, such as CRT displays or strobed printed and graphic matter. The assembly and configuration of exemplary embodiments of the disclosed devices operate to maximize the signal-to-noise ratio (SNR), as well as to provide an optimal field of view that simulates the field of view of the human eye. Geometric elements and features of the device design, in conjunction with the assembly procedure assure precise alignment of optical elements, including sensors, filters, and other elements within the enclosure and optical path.

The present disclosure further provides advantageous systems and methods for applying correction factors related to display systems, such correction factors advantageously taking into consideration ambient light conditions. According to exemplary embodiments, a colorimeter is provided with programming, through software and/or hardware, to calculate and apply one or more correction factors to compensate for ambient light conditions. As described in greater detail below, the disclosed correction system and methodology streamlines the calculations associated with the C.I.E. Color Appearance Model specification, i.e., the CIECAM02 specification, such that ambient condition corrections may be implemented on an expeditious, real-time basis, without the need for substantial processing infrastructure. Despite the streamlined nature of the disclosed correction system and methodology, the systems and methods of the present disclosure achieve excellent correlation relative to the CIECAM02 specification across a broad range of ambient conditions.

As is known in the art, the CIECAM02 specification a number of parameters, namely: c, Nc, and F. "Nc" is defined as the chromatic induction factor, whereas the constants "c" and "F" relate to the impact of the surround and the degree of adaptation. The CIECAM02 parameters are based upon the surround ratio ($S_r$ or Sr), which is calculated based on the following formula:

$$S_r = L_{SW}/L_{DW} \qquad (1)$$

where $L_{SW}$ is the luminance of the surround white and $L_{DW}$ is the luminance of the device white. The surround ratio (Sr) is used to specify the "c" constant as documented in Table 1 of the CIECAM02 specification. According to the present disclosure, the tabular data was extracted from the CIECAM02 specification and a numeric relationship was derived based on a plot of "c" versus "Sr", as set forth in FIG. 1.

Figure 1:
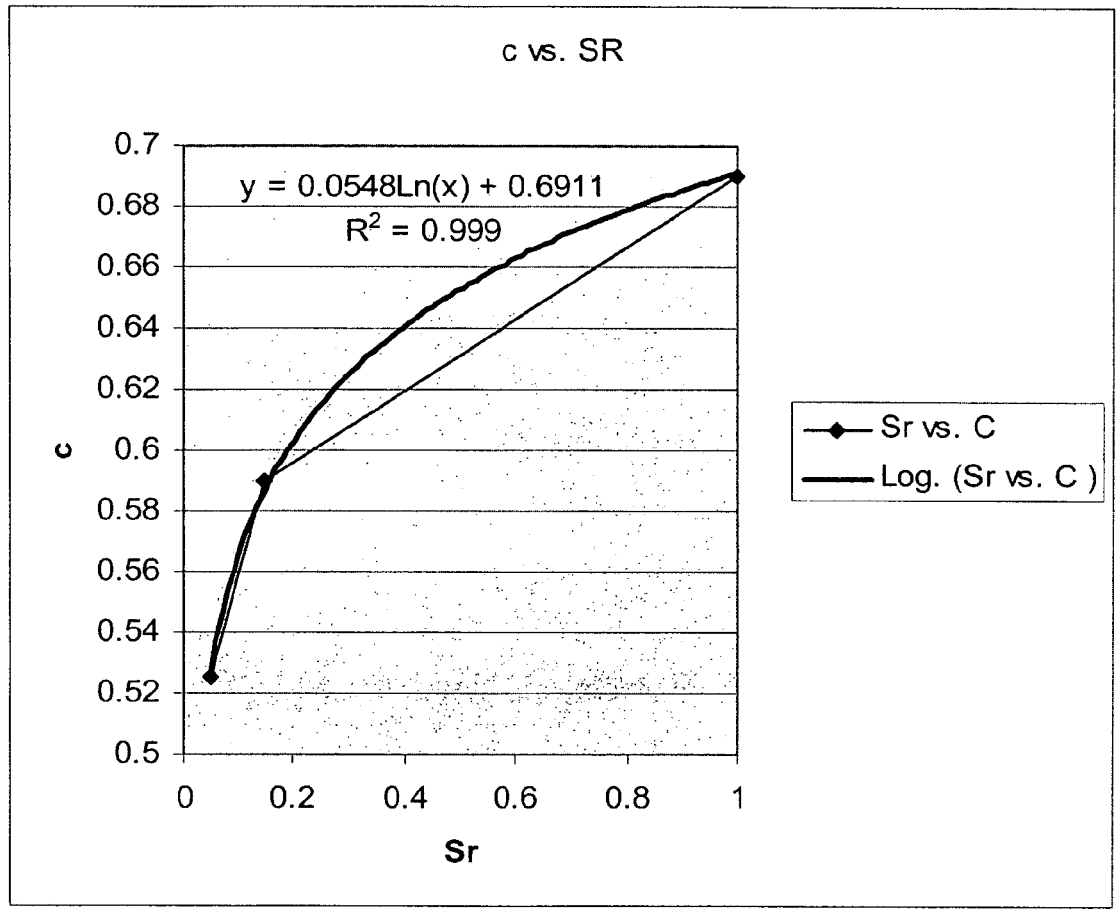
FIG. 1 is a plot of the CIECAM02 constants "c" vs. "Sr" (surround ratio) according to the present disclosure.
Figure 2:
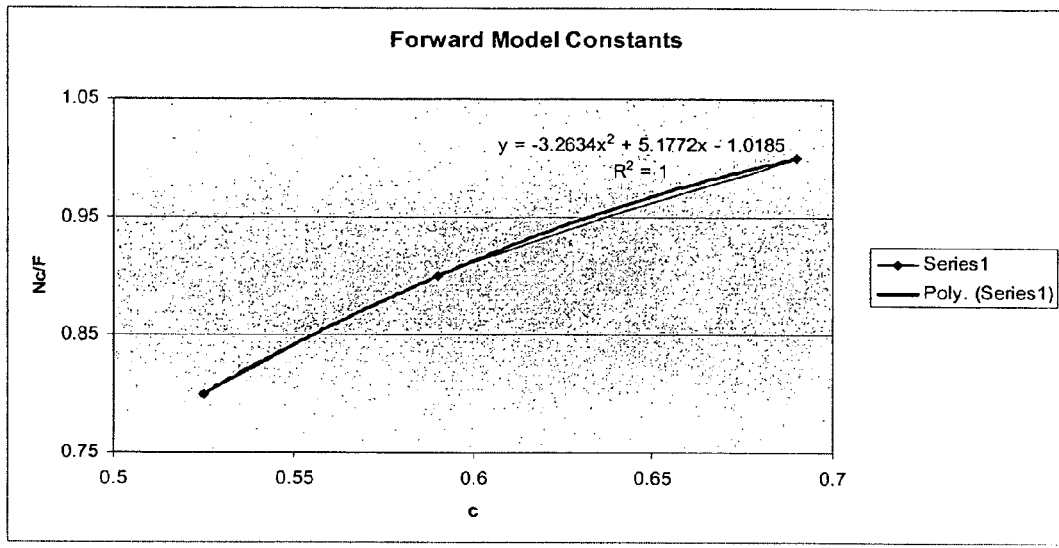
FIG. 2 is a plot of forward model CIECAM02 constants, wherein "Nc/F" is plotted relative to "c" according to the present disclosure.

The CIECAM02 specification also details the relationship between the parameters "c", "Nc" and "F". This relationship is reflected in a figure in the CIECAM02 specification, which is reproduced as FIG. 2, together with a numerical model for the relationship. According to the CIECAM02 specification, the suggested range is 0.05<Sr<1. Hence, with reference to FIG. 1, the range of "c" values falls nominally between 0.52 and 0.69. Thus, as the luminance of the surround changes, the surround ratio is calculated as specified in Equation (1), and the numerical relationships derived in FIGS. 1 and 2 are used to calculate the CIECAM02 constants Turning to adaptation luminance, it is noted that adaptation luminance is generally assumed to be 20% of the diffuse white value. In a display/ambient situation, there are two potential sources for a reference white. First, when the ambient is low, the white on the display (e.g., the CRT screen) predominates. Second, when the ambient diffuse white is higher than the display white, it is preferable to use the ambient diffuse white as the basis for the adaptation luminance. This determination may be programmed in a straightforward manner, for example:

```
if(theModelData->dYxyAmbientLuminance.Y < theModelData-
>dDisplayMaxLuminance)
 {theModelData->m_dAdaptationLuminance = 0.20*theModelData-
>dDisplayMaxLuminance; }
else
 theModelData->m_dAdaptationLuminance = 0.2 * theModelData-
>dYxyAmbientLuminance.Y;
```

This approach to selecting the reference white is significant for purposes of the present disclosure. When the display is in low light (dim) conditions, the adapting luminance is constant. However, the surround ratio ($S_r$) is not constant so there is a region where the perception of the image is still affected by the ambient change, but the assumed adaptation luminance is not changing. As the ambient luminance is increased, a point is reached where ambient luminance predominates over the adaptation luminance, while still affecting the surround ratio.

Based on the foregoing, it is apparent that there are three basic conditions:

1. Dark surround—Adaptation luminance is fixed, Surround Ratio is changing
2. Dim surround—Adaptation luminance is changing, Surround Ratio is also changing.
3. Light surround—Adaptation luminance is changing, Surround Ratio is fixed.

The third case occurs only when the Surround Ratio (Sr) exceeds 1. In the CIECAM02 model, the working range of Sr is 0.05<Sr<1.0. Thus, the CIECAM02 specification basically fixes the range of the parameter "c" between 0.05 and 0.69, as shown in FIG. 2.

According to the present disclosure, the first step in arriving at an appearance model correction methodology involved taking a Gamma-mapped RGB value and mapping it through an sRGB matrix to arrive at a XYZ display value according to Equation (2):

$$\begin{bmatrix} X_d \\ Y_d \\ Z_d \end{bmatrix} = \begin{bmatrix} a_{11} & \cdots & \cdots \\ \cdots & \cdots & \cdots \\ \cdots & \cdots & a_{33} \end{bmatrix} \begin{bmatrix} R' \\ G' \\ B' \end{bmatrix} \quad (2)$$

The flare light is then added to XYZ display value to arrive at tri-chromatic values of the scene data in the ambient conditions according to Equation (3):

$$X_s = X_d + X_f$$

$$Y_s = Y_d + Y_f$$

$$Z_s = Z_d + Z_f \quad (3)$$

The XYZ scene data is then mapped through the CIECAM02 model into JHC space, as shown in Equation (4). This model uses the values for c, Nc and F that were calculated based upon the ambient illumination conditions, as described above:

$$\begin{bmatrix} J_s \\ H_s \\ C_s \end{bmatrix} = XYZ2JCH_{CIECAM02(ambient)} \begin{bmatrix} X_s \\ Y_s \\ Z_s \end{bmatrix} \quad (4)$$

The JHC data is then remapped thru the inverse CIECAM02 model using parameters c, Nc and F for a dark surround, as shown in Equation (5):

$$\begin{bmatrix} X_d \\ Y_d \\ Z_d \end{bmatrix} = JCH2XYZ_{CIECAM02(dark)} \begin{bmatrix} J_s \\ H_s \\ C_s \end{bmatrix} \quad (5)$$

This XYZ data is then passed thru the inverse sRGB matrix to arrive at linear RGB data, as shown in Equation (6):

$$\begin{bmatrix} R' \\ G' \\ B' \end{bmatrix} = \begin{bmatrix} a_{11} & \cdots & \cdots \\ \cdots & \cdots & \cdots \\ \cdots & \cdots & a_{33} \end{bmatrix}^{-1} \begin{bmatrix} X_d \\ Y_d \\ Z_d \end{bmatrix} \quad (6)$$

Each Pixel is then remapped through the gamma correction table.

Figure 3:
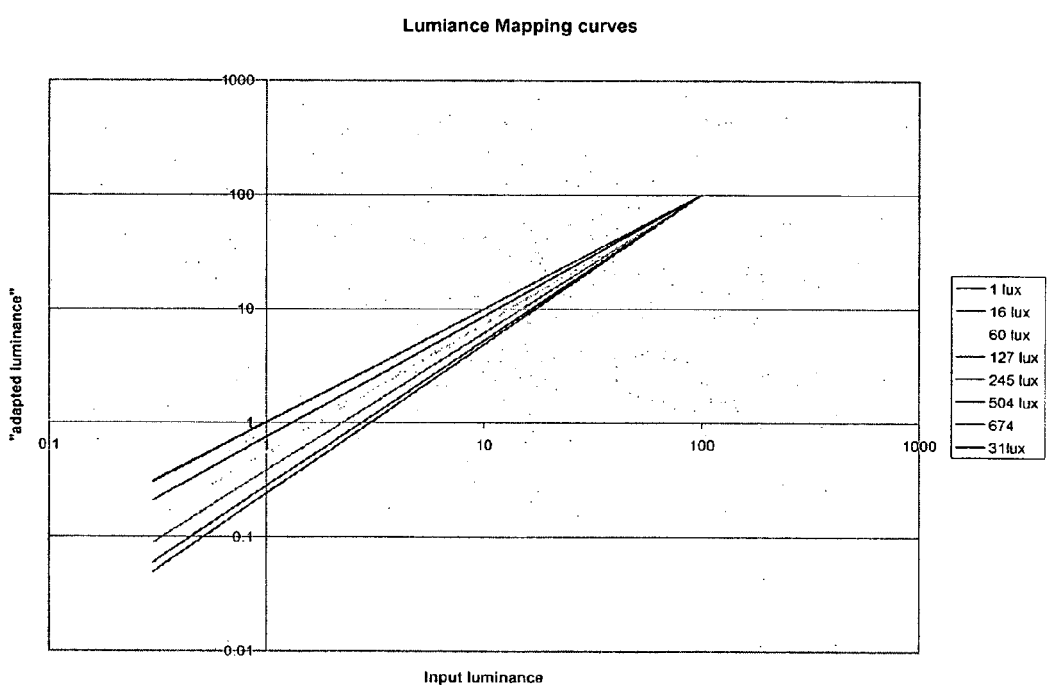
FIG. 3 is a graph of luminance mapping curves based on changes in ambient illuminance (with no flare considerations)

With reference to FIG. 3, a graph of the response changes that occur based on a change in ambient illuminance (with No Flare considerations) is provided. The "x" axis of the plot set forth in FIG. 3 is the original input luminance value. The "y" axis is labeled "adapted luminance" because the output data is not in absolute luminance, but represents the appearance of the input luminance in the output scene. For illustration purposes the data is plotted on a log-log scale. Of note, the fact that relationships are all linear in log space demonstrates that a simple "gamma" correction may be used to compensate for ambient conditions in a simple and advantageous manner.

Figure 4:
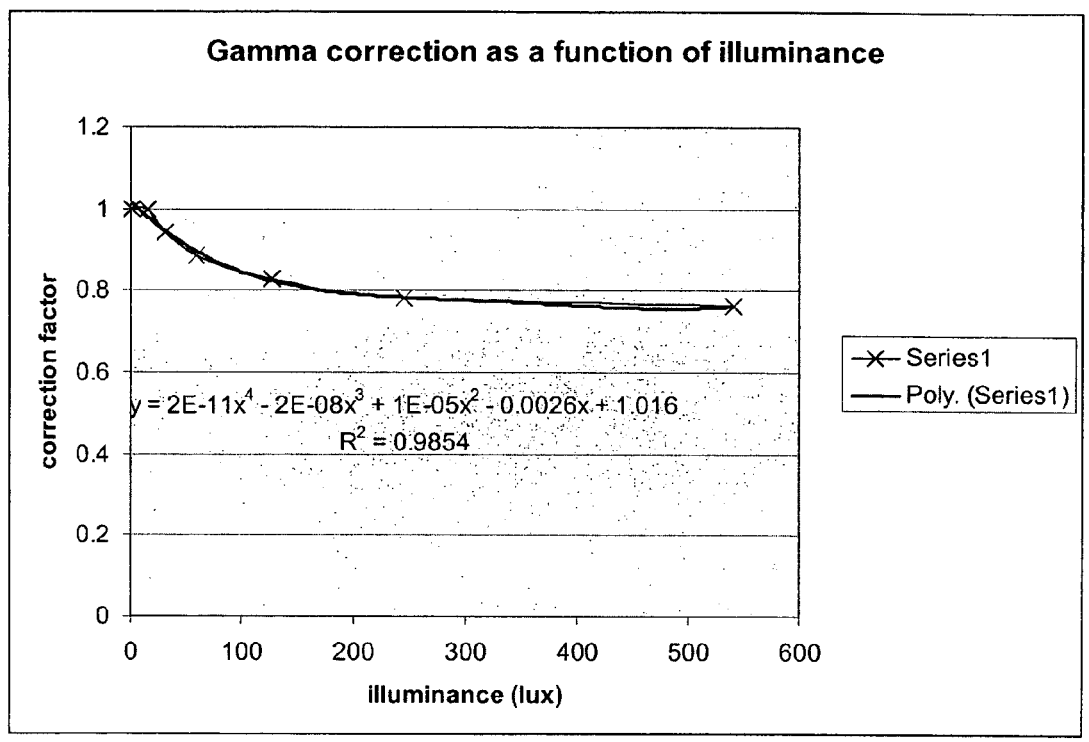
FIG. 4 is a plot of gamma correction as a function of illuminance according to the present disclosure.

Indeed, the plot of FIG. 4 shows that a fourth order polynomial fits the data collected from the model, and such fourth order polynomial (which is set forth below as Equation (7), wherein "x" corresponds to illuminance (lux) permits real time display correction, thereby addressing display appearance issues associated with illuminance levels.

$$y = 2E-11x^4 - 2E-08x^3 + 1E-05x^2 - 0.0026x + 1.016 \quad (7)$$

It is noted that the data generated according to the polynomial-based correction algorithm set forth herein is very close to reference data in the literature for ratios of 1:1, 1.25:1 and 1.5:1 (which correspond to dark, dim and light conditions, respectively), e.g., data provided by Hunt, and Bartlelson and Breneman. Thus, the polynomial-based correction algorithm set forth herein generates gamma correction coefficients to correct the appearance of a display across a range of illumination levels, including specifically higher illumination levels.

Thus, according to the present disclosure, correction systems and methodologies are provided that employ a polynomial correction factor that represents an abstraction from the multi-variable CIECAM02 specification and that advantageously correlates with eye adaptation issues associated with ambient conditions. An appropriate color appearance model is achieved through a polynomial-based correction algorithm that generates gamma correction coefficients to correct a display appearance based on illuminance levels, i.e., over a range of illumination levels. The disclosed polynomial-based correction algorithm has demonstrated excellent correlation with data collected from CIECAM02 modeling of data for a range of illumination conditions, e.g., dark, dim and light conditions.

Implementation of the disclosed polynomial-based algorithm is generally achieved through appropriate software programming, e.g., firmware, associated with a colorimeter or other color measurement system, or hardware implementation, e.g., with an ASIC. The polynomial-based algorithm is generally run on a processing unit associated with the colorimeter, although alternative implementations may be employed, e.g., network-based processing. The gamma correction factors generated by the disclosed polynomial-based algorithm are applied to a display, e.g., a CRT, to provide enhanced viewing of the display based on existing ambient conditions.

The disclosed polynomial-based algorithm is generally effective for display correction over a surround luminance range that is bounded at the upper end by a surround luminance that is twice the level of the display luminance. For surround luminance values that exceed the foregoing 2x boundary, the polynomial-based algorithm will have no corrective effect.

According to exemplary embodiments of the present disclosure, the polynomial-based algorithm is employed with a colorimeter that is designed to maximize the signal-to-noise ratio and to sense light emitted from a target surface by matching the colorimeter's field of view to that of the human eye for devices that measure target surfaces (e.g., displays, CRT's, LCD's, printed, and pictorial materials), commonly viewed by humans. Accordingly, in an exemplary embodiment of the present disclosure, a color sensing device for sensing light emitting from a target surface includes a chamber block having at least three overlapping spectral light passages extending through the chamber block configured to select a preferred field of view between the target surface and a corresponding sensor adapted to detect light from the target surface. Each light passage is configured having an entry orifice, exit orifice and an intermediate chamber. The entry orifice faces the target surface and is defined with an entry wall defining an entrance for emitted light from the target surface into the light passage. The exit orifice faces the sensor and is defined with an exit wall defining an exit for the emitted light from the light passage. The chamber intermediate the entry and exit walls is defined by a chamber wall having a diameter larger than a diameter of the entry and exit walls.

One particular embodiment of the device is configured with a viewing angle or field of view (FOV) in the range of +/−5 to 7 degrees. This FOV is near optimum for achieving the desired performance for the low cost colorimeter, and effectively matches the human eye field of view. A chamber block element, which can be sized to fit into the existing products, has a number of light passage chambers, the chamber being configured relative to entry and exit orifices of each light passage is positioned, configured and dimensioned to meet the +/−5 to 7 degree requirement to achieve the desired FOV. The chamber block can be molded from a material that minimizes reflectance of the chamber walls, thereby preserving the selected FOV.

In addition, the chamber block is configured with guide pins and a number of filter stack cavities which allow for alignment of the sensors and their respective molded lenses to the center of the optical field. The device components, such as the sensors, filters, printed circuit board (PCB), molded chamber block, housing, and other system elements can be assembled prior to soldering the sensors to the PCB. These self-aligning and pre-solder assembly qualities enable a significantly improved SNR relative to conventional devices e.g., four to five times higher).

Crushable ribs can be employed during assembly to provide a compliance that both preserves filter integrity, while simultaneously providing adequate clamping force to hold system elements in place. The device is not affected by mounting compliance or other variable factors. The design enables different filter sets to provide overlapping or non-overlapping spectrally selective channels. In operation, the colorimeter characterizes the measured target surface as the human eye would see it, including both the human eye's color response and field of view. In the case of a display screen, the device can be configured to detect the type of display. Thus, a low cost high accuracy colorimeter is provided.

Figure 5:
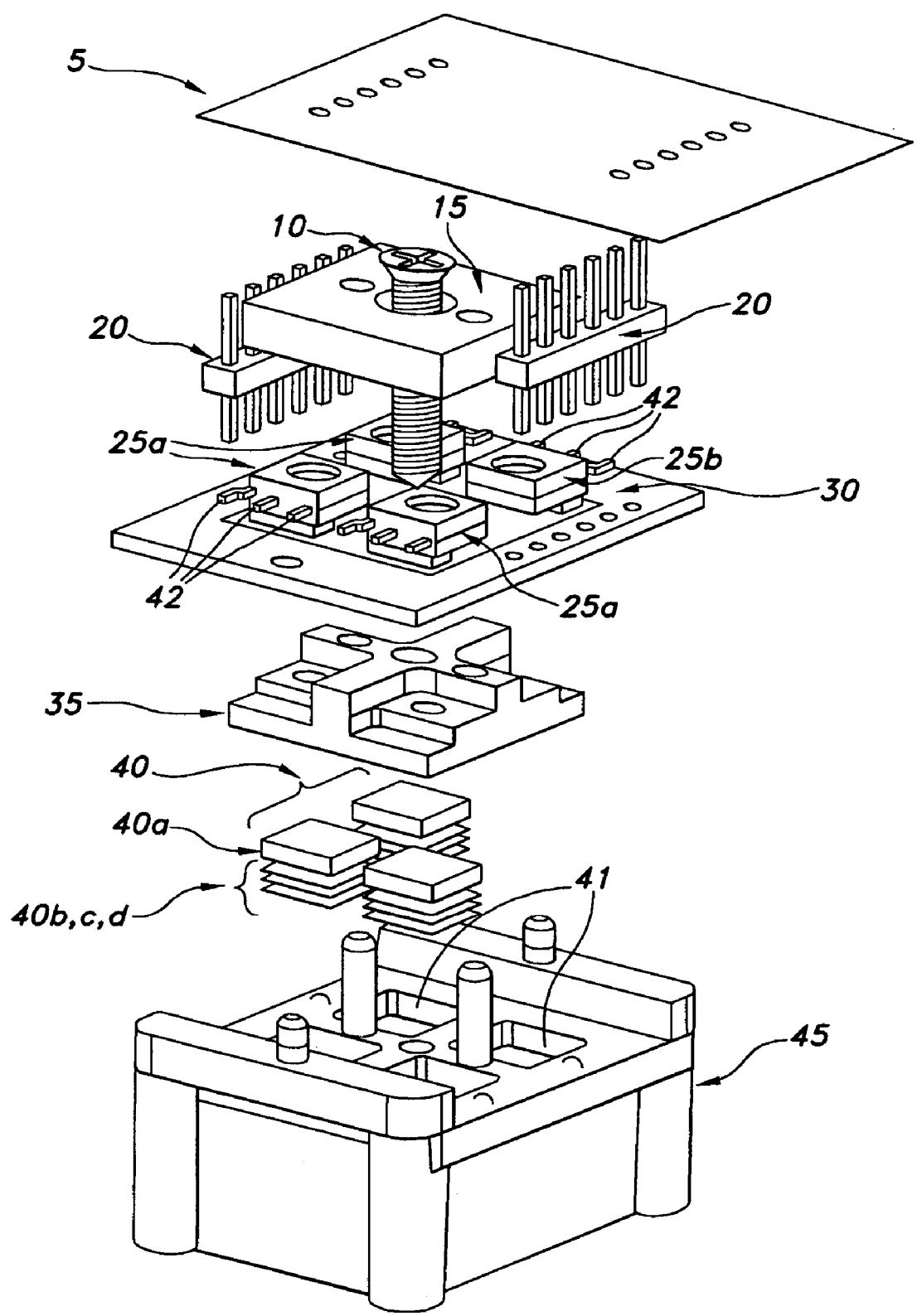
FIG. 5 is an exploded view of a HTF light tunnel sensor of a target colorimeter configured with a tube block in accordance with the prior art.

FIG. 5 is an exploded view of a prior art colorimeter assembly configured in accordance with one disclosed in U.S. Patent Publication No. 2004-0114144, entitled "Colorimeter with High SNR", the contents of which are incorporated herein in their entirety. As can be seen, the assembly includes a sensor shield 5, a clamping screw 10, a clamping block 15, pin headers 20 and a corresponding PCB assembly 30, a number of sensors 25*a-b*, a sensor locating element 35, a number of filter stacks 40, and a tube block 45. Other components and features, such as a dust cover, cabling, and colorimeter circuitry, may also be included in the design as will be apparent in light of this disclosure.

The assembly procedure will be apparent from FIG. 5. Three filter stacks 40, each of which includes a glass layer 40*a* and three filter layers 40*b-d*, are placed in respective cavities of the tube block 45. Each cavity has a centrally located light passage that travels through the tube block 45 to allow intake of light from a target surface. The sensor locating element 35 is placed onto the tube block 45 via center guide pins to secure the filter stacks 40 in their cavities. The lead frame PCB assembly 30 is placed into position on the tube block 45 via a set of end guide pins. Three light-to-frequency sensors 25*a* and a light-to-voltage sensor 25*b* are placed in their respective positions, so that the lens of each sensor 25 is received into an lens alignment hole of the sensor locating element 35, thereby enabling filtered light to be received via the corresponding light passage. The clamping block 15 is placed over the sensors 25 via the guide pills of the tube block 45. The clamping screw 10 is torqued to secure the assembly. The sensor leads can then be soldered to the PCB assembly 30. Note that functional testing of the device can be performed before and/or after the soldering (assuming the unsoldered leads are in proper electrical contact). The sensor shield 5 can be installed over and/or around the clamping block 15 to prevent extraneous light from entering the back of the device, which reduces measurement accuracy. Also, a removable dust cover 5 can be coupled with the target surface side of the tube block 45 to protect the device until its use.

These particular sensor features are part of the manufacturer's design, and are accommodated by the designated features of the sensor locating element 35. In one particular embodiment, for example, sensors 25*a* are each a Texas Instruments TSL235 light-to-frequency converter, and sensor 25*b* is a Texas Instruments TSL250R light-to-voltage converter. It will be appreciated in light of this disclosure that other sensors types, shapes, and configurations can be used here as well.

Note that the clamping block 15 and the sensor locating element 35 can be fabricated in a similar fashion as the tube block 45 (e.g., a molded material having a low reflectance, such as black ABS/PC plastic). Further note that the overall assembly can be mated to a primary PCB which contains all ancillary circuits to accomplish colorimeter functions, such as spectral measurement, spectral translations to standard coordinate systems, integration of samples, determination of display type, timing, and other required functionality.

FIG. 6 is a cross sectional view of the tube block assembly 45 of FIG. 5 illustrating a pair of light passages 520 extending therethrough having a cylindrical or tube shape and having substantially the same diameter along a length thereof.

The inventors' prior filing in U.S. Patent Publication No. 2004-0114144 describes a complete colorimeter with tile physical body geometry optimized for maximum SNR including an optical tube body (tube block member 45 of cited application), and further includes other mechanical, electronic and software elements as disclosed in U.S. Pat. No. 5,892,585. Among the geometric features cited in the preceding was the statement: "The molded material for the tubes was filled material that minimized the reflectance of the walls of the tube, preserving the proper selection of the field of view." This was an important feature for maximizing SNR and a significant improvement over prior art. However, further research testing and evaluation has led to the conclusion that there was some residual reflection from the tube walls, which has been corrected by the refinement disclosed herein (e.g., replacing the cylindrical tube with a chamber with recessed walls and other features which may also include use of material with minimum reflectance.

As a further improvement, the inventors redesigned the tube block 45 by removing the walls of each tube, and replacing them with a respective chamber. The chamber was so designed that the entrance and exit orifices of each tube remained intact. This positioning and design of the orifices preserved two advantages of the tube geometry: 1) the ability to optimize for the angular field of view of the instrument, and 2) the rejection and elimination of light rays not traveling in the desired direction that would deteriorate the SNR if not eliminated. Further, the chamber is designed so that the walls of the chamber are oriented to minimize reflectance of extraneous rays from reaching the sensor. The tube block disclosed in the prior application from the inventors included a tube block element (45), consisting of cylindrical tubes from the entry orifice to the sensor of each optical channel of the colorimeter. In the exemplary embodiments disclosed herein, each tube is replaced with a chamber having recessed walls or larger diameter walls than the entry and exit orifices, with one chamber per sensing channel.

It has been found that by replacing the walled tube with remote-walled chambers, or recessed chambers, has further improved the SNR of the instrument by significantly reducing extraneous noise rays. An exemplary embodiment of the new chamber block is desirably molded as a two part chamber block consisting of a member with the chambers and respective front orifices and a member with respective rear orifices which also can be used to aid in the final positioning and alignment of the optical sensors. These two members constitute the chamber block cited herein as a significant improvement over the previously disclosed tube block while preserving all of the other features of the inventors prior art.

Further, in addition to replacement of each tube with a corresponding chamber, baffles may be added to further improve the SNR ratio. The baffles can be disposed either within the chambers or, outside of the chamber (as in proximity to the entrance and exit or both).

Referring now to FIG. 7, a partial cross section view of a chamber block 145 is illustrated showing a light passage therethrough in accordance with an exemplary embodiment. It should be noted that chamber block 145 may be substituted for the tube block 45 of FIG. 5. It will also be noted that referenced elements 110-119 represent the features of the improved geometry disclosed herein. Other elements referenced as elements 5-41 (with the exception of 110-119) are used to provide a description of the prior invention for which the new material disclosed herein pertains to the disclosed improvement.

The invention disclosed herein represents a collection of geometric parts and certain key features associated with these parts to optimize the field of view (favoring approach to that of the human eye response), SNR ratio, selection of materials and geometry with respect to reflectance, clamping of the assembly without deforming the filters, free floating of the sensors during clamping followed by soldering in place after clamping, providing dust protection and securing parts in place for ease of assembly.

As described above with reference to FIGS. 5 and 6, in conjunction with FIG. 7, clamping block 15 has bump features (not shown) to apply a clamping pressure on the back of the sensor 25. Sensor 25 fits between clamping block 15 and sensor locating element 35. Sensor locating element 35 mates to sensor 25 with semicircular referencing lens alignment feature (not shown) forcing intimated contact with the reference lens alignment feature to establish alignment of the lens with the center of the remainder of the optical path consisting of elements: light passage 520, filter stacks 40, filter stack cavity 41 of chamber block 145, field control orifices 115, 116 of chamber block 145, and a clear dust cover or sensor shield 5. Further, a planar locating reference surface of sensor 25 mates with locating element planar reference surface of sensor locating element 35 to assure planar alignment of the sensor 25 parallel to the target surface or source image (not shown).

As in U.S. Patent Publication No. 2004-0114144, lead frame/PCB assembly 30 positions the collection of optical elements between clamping block 15 and sensor locating element 35. It is so designed that it provides a soldering point for connecting sensor 25 to the system electronics.

Filter stack cavity 41 of chamber block 145 provides a means for accommodating a variety of filter combinations within filter stack 40 to characterize a measurement channel spectrally. Field control entry orifice 115 and exit or 116 of chamber block 145 have an optimally calculated and derived orifice diameter 114 and a length 113 that is determined by the respective orifice diameter 114 and calculations that derive the optimal field of view.

Clamping of the entire assembly, including clamping block 15, sensor(s) 25, sensor locating element 35 and chamber block 145, is accomplished by tightening clamping screw 10 to chamber block 145 and secured by screwing screw 10 into a threaded hole of the chamber block 145.

During this entire assembly process, the sensor 25 is free to float and locate as described in the clamping procedure description above with reference to FIG. 5. Each of the sensors 25 becomes accurately aligned as a result of the design and the clamping action of tightening clamping screw 10. After clamping, the sensor leads 42 are soldered to the lead frame/PCB assembly 30. Dust cover or sensor shield 5 fits over the exposed surface of the colorimeter to block entry of dust and other contaminants.

Electrical tape is used at several locations during fabrication to facilitate assembly. The assembly discussed embodies all of the features of the invention. This assembly in turn mates to the system's primary PCB which contains all ancillary circuits to accomplish: spectral measurement, spectral translations to standard coordinate systems, integration of samples, determination of display type, timing, and other required elements.

Also necessary to the successful operation of the invention are a number of software and firmware routines that the inventors have developed to achieve the objectives of the invention with optimum performance. Examples of these software, firmware, and circuit functions are largely described in U.S. Pat. No. 5,892,585 incorporated herein by reference in its entirety. In exemplary embodiments of the present disclosure, however, the polynomial-based algorithm described herein is utilized to effect desired corrections with respect to ambient conditions.

Referring again to FIG. 7, one exemplary embodiment of the chamber block 145 is illustrated for use with a color sensing device for sensing light emitted from a target surface. Chamber block 145 includes at least three overlapping spectral light passages 520 (only one shown) extending through the chamber block 145 configured to select a preferred field of view between the target surface and a corresponding sensor 25 adapted to detect light from the target surface. Each light passage 520 includes entry orifice 115 facing the target surface (not shown). The entry orifice 115 is defined with an entry wall 120 defining an entrance for emitted light from the target surface into the light passage 520. The exit orifice 116 facing a respective sensor 25 is defined with an exit wall 121 defining an exit for the emitted light from the light passage 520. The chamber 119 is disposed intermediate the entry and exits walls 120, 121, respectively. The chamber 119 is defined by a chamber wall 122 having a diameter larger than a diameter of either of the entry and exit walls 120, 121, respectively. FIG. 7 illustrates that both the entry and exit walls 120, 121 each form a frustoconical orifice. However, it is contemplated that one or the other may be cylindrical, or both be cylindrical, having a substantially constant diameter along a length thereof.

In an exemplary embodiment, as shown, the entry orifice 115 is defined with an entry opening 123 to the chamber block 145 having a diameter smaller than a first opening 125 to the chamber 119. Further, the exit orifice 116 is defined with an exit opening 126 to the chamber block 145 having a diameter larger than a second opening 127 to the chamber 119. The first and second openings 125, 127 defining opposite openings of the chamber 119 connected to the entry and exit walls, respectively.

As best seen with reference to FIG. 9, the chamber block 145 may be a two part separable chamber block 145. More specifically, chamber block 145 is desirably molded as a two part chamber block comprising two separable members to aid in the final positioning and alignment of the optical sensors.

Further, with reference to FIGS. 8 and 9, the chamber block may include a baffle 117, 118 having an aperture 130 aligned with the light passage 520 of the block 145. The baffle 117, 118 may be disposed inside the chamber 119 (FIG. 8) or outside the chamber 119 in proximity of the entry or exit orifices 115, 116, respectively, (FIG. 9) to eliminate or minimize extraneous light rays that might reach the sensor 25 and degrade the signal-to-noise ratio.

FIG. 8 depicts the baffle 117 disposed inside the chamber 119. Further, the corresponding aperture thereof is defined by a by countersink on opposite surfaces defining the baffle 117. FIG. 9 depicts the baffle disposed outside the block 145 and spaced from a respective corresponding entry orifice 115.

The principles of the present disclosure discussed above may be employed by any colorimeter or similar sensing device. One such colorimeter design is described in detail in U.S. Pat. No. 5,892,585, which is herein incorporated by reference in its entirety. Note that a number of software and firmware routines can be used to achieve optimum colorimeter performance. Example software, firmware, and circuit functions are also described in the U.S. Pat. No. 5,892,585. Generally, a colorimeter is designed to simulate the color response of a human eye. An RGB result is calculated based on the colorimeter channel outputs (e.g., X, Y, and Z).

In addition, mounting techniques can be employed to further improve the device performance, such as the mounting techniques described in U.S. Patent Publication No. 2004-0075032, titled "Sensor with Suction Cup Array Mount", and in U.S. Patent Publication No. 2004-0080749, titled "Colorimeter with Single Cable Low Impact Mounting System".

As discussed above in the background, it has been recognized that ambient light presents many problems and challenges to colorimeter measurement quality. To date the most sophisticated approaches are limited to taking a reading of the ambient at a point and then depending on that measurement for all ensuing ambient light compensation. Typically this is accomplished by turning the colorimeter away from the source image to take a reading of the ambient light. In some instances a diffuser is placed of the colorimeter to improve the specific and single measurement.

The applicants recognize the need to maximize the signal-to-noise ratio of any colorimeter and address matching the colorimeter's field of view to that of the human eye for devices that measure targets (displays, CRT'S, LCD'S, printed, and pictorial materials, for example, but not limited thereto) commonly viewed by humans, and further the need to compensate for the effects of ambient light reaching the sensor. Still further, the applicants recognize that if one could compensate for the perception of the human eye in the presence of ambient light impinging on the image source that a significant step forward in the state of colorimetry would be achieved. This area has been addressed and significant improvements have been added to colorimetry by adding the capability to read ambient light (specifically that light that is impinging upon the image source) in real time and developing supporting algorithms to compensate for deleterious effects.

As noted above, prior art colorimeters measure ambient light by removing the colorimeter body from the image source screen, placing a diffuser on the viewing surface of the colorimeter, and orienting the combination away from the screen to get a reading estimate of the ambient light.

The present invention disclosed herein orients a rear facing ambient sensor on the main printed circuit board (PCB). The rear facing ambient sensor is capable of viewing the incoming ambient light while a set of forward facing color sensors simultaneously read the luminance emanating from the image screen. The ambient viewing path can be in the form of a chamber and orifice or can be fitted with a light-pipe, both means accomplish measurement of the ambient light in a manner that closely matches the incoming direction of most closely captures the effective characteristics of the ambient light. Alternatively, LEDs can be included to provide feedback information including but not limited to: 1) status such as when the colorimeter is calibrating, 2) when there has been a significant change in ambient light.

Figure 10:
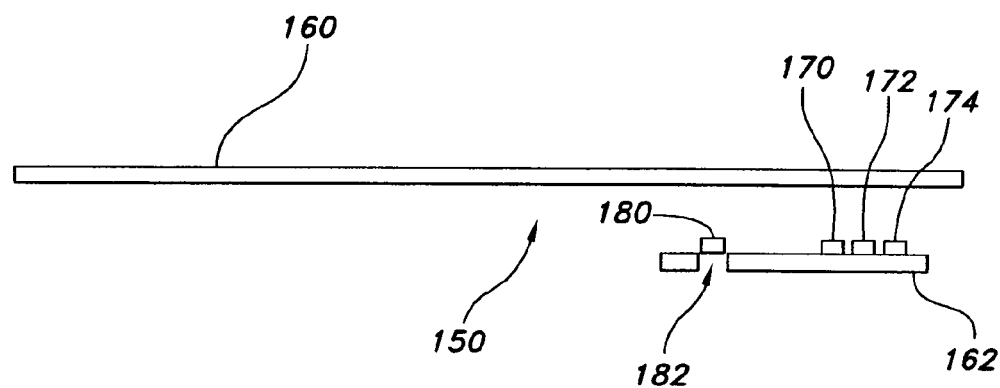
FIG. 10 is a simplified schematic diagram illustrating a colorimeter for simultaneously measuring ambient light illumination impinging on a source image and the attributes of the luminance emanating from the source image in accordance with the present disclosure.

FIG. 10 is a simplified schematic of a system 150 for simultaneously measuring ambient light illumination impinging on a source image 160 and the attributes of the luminance emanating from the source image 160. In the embodiment shown, source image 150 is an image displayed on a monitor. System 150 includes a primary colorimeter PCB 162 with sensors 170, 172, and 174 facing the source image 160 to make component readings of the luminance emanating from the source image 160. An ambient sensor 180 faces rearward viewing ambient light impinging on the surface of the source image 160. An aperture or chamber 182 allows passage of the ambient light to the associated rear-facing sensor 180 operably coupled to PCB 162.

Figure 11:
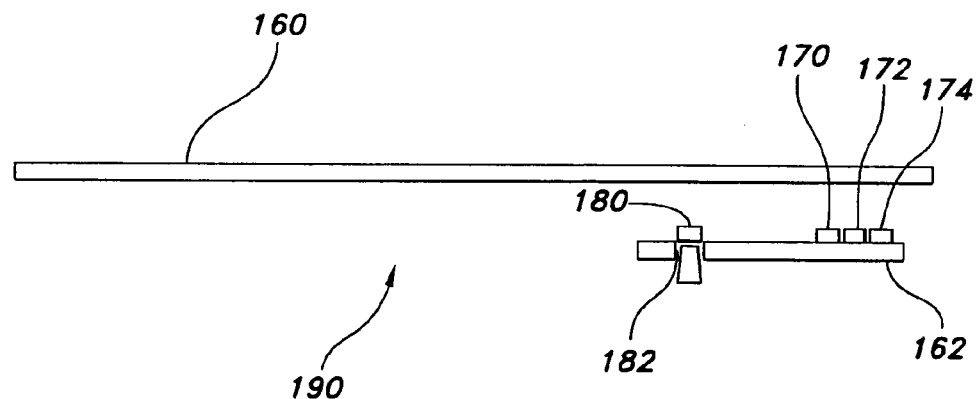
FIG. 11 is a simplified schematic diagram of another colorimeter for simultaneously measuring ambient light illumination impinging on the source image and the attributes of the luminance emanating from the source image having a light-pipe directing the ambient light to an associated rear-facing sensor.
Figure 12:
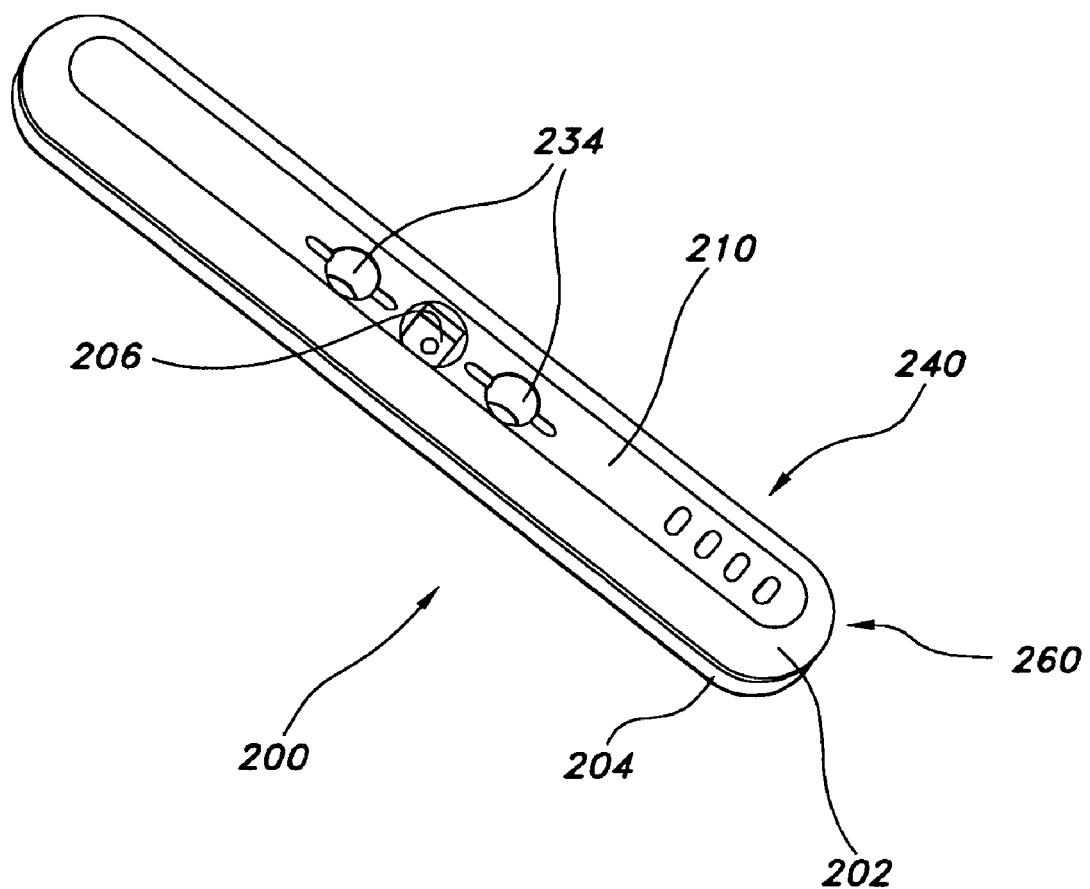
FIG. 12 is a front perspective view of a colorimeter similar to the colorimeter shown in FIG. 11, illustrating a plurality of light emitting diodes (LEDs) to indicate a status of the colorimeter to a user.

FIG. 11 is simplified schematic of a system 190 for simultaneously measuring ambient light illumination impinging on the source image 160 and the attributes of the luminance emanating from the source image 160 in accordance with an exemplary alternative embodiment. Just as in FIG. 10, the primary colorimeter PCB 162 is operably connected to the sensors 170, 172 and 174 facing the source image 160 to make component readings of the luminance emanating from the source image 160. In addition, the ambient sensor 180 faces rearward viewing ambient light impinging on the source image surface 160. A light pipe 194 is disposed within aperture 182 and directs the ambient light to the associated rear-facing sensor 180 operably coupled to the PCB 162.

Referring now to FIGS. 12-16, a colorimeter 200 embodying the elements described with respect to FIGS. 10 and 11 is illustrated. Colorimeter 200 includes a front cover 202 and a rear cover 204 housing components associated with colorimeter 200. The front cover 202 faces the impinging ambient light while the back cover 204 faces the source image (not shown). The front cover 202 is configured to receive a light pipe 210 for receiving the impinging ambient light. The light pipe 210 includes a lens 206 for directing impinging light to an ambient light sensor aligned therewith. A major portion of the light pipe 210 is shown having an exposed surface that is substantially flush with front cover 202, however, other suitable configurations are contemplated.

Figure 14:
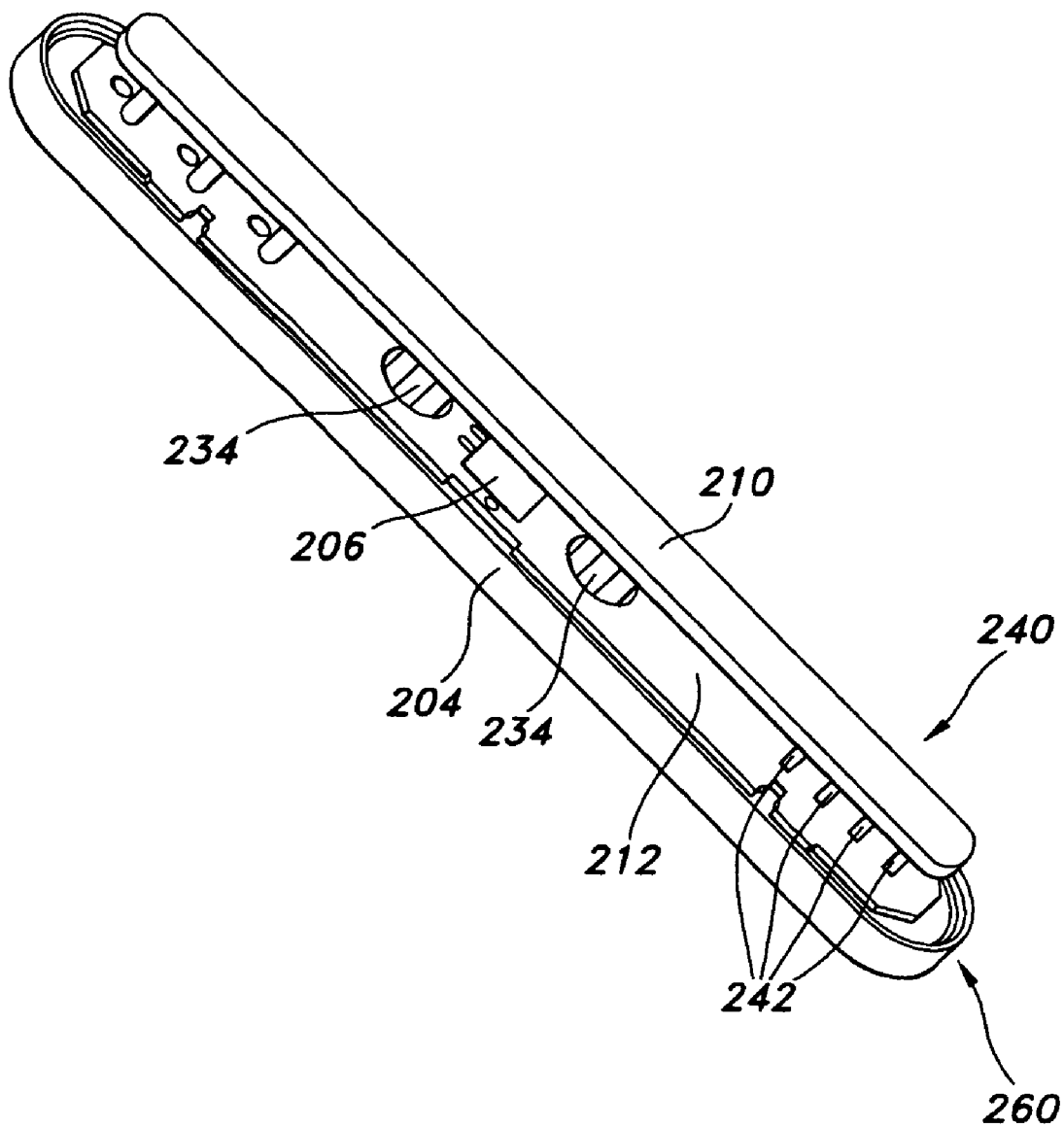
FIG. 14 is an exploded front perspective view of the colorimeter of FIG. 12, illustrating a housing, PCB and light pipe of the colorimeter with a front cover removed.
Figure 15:
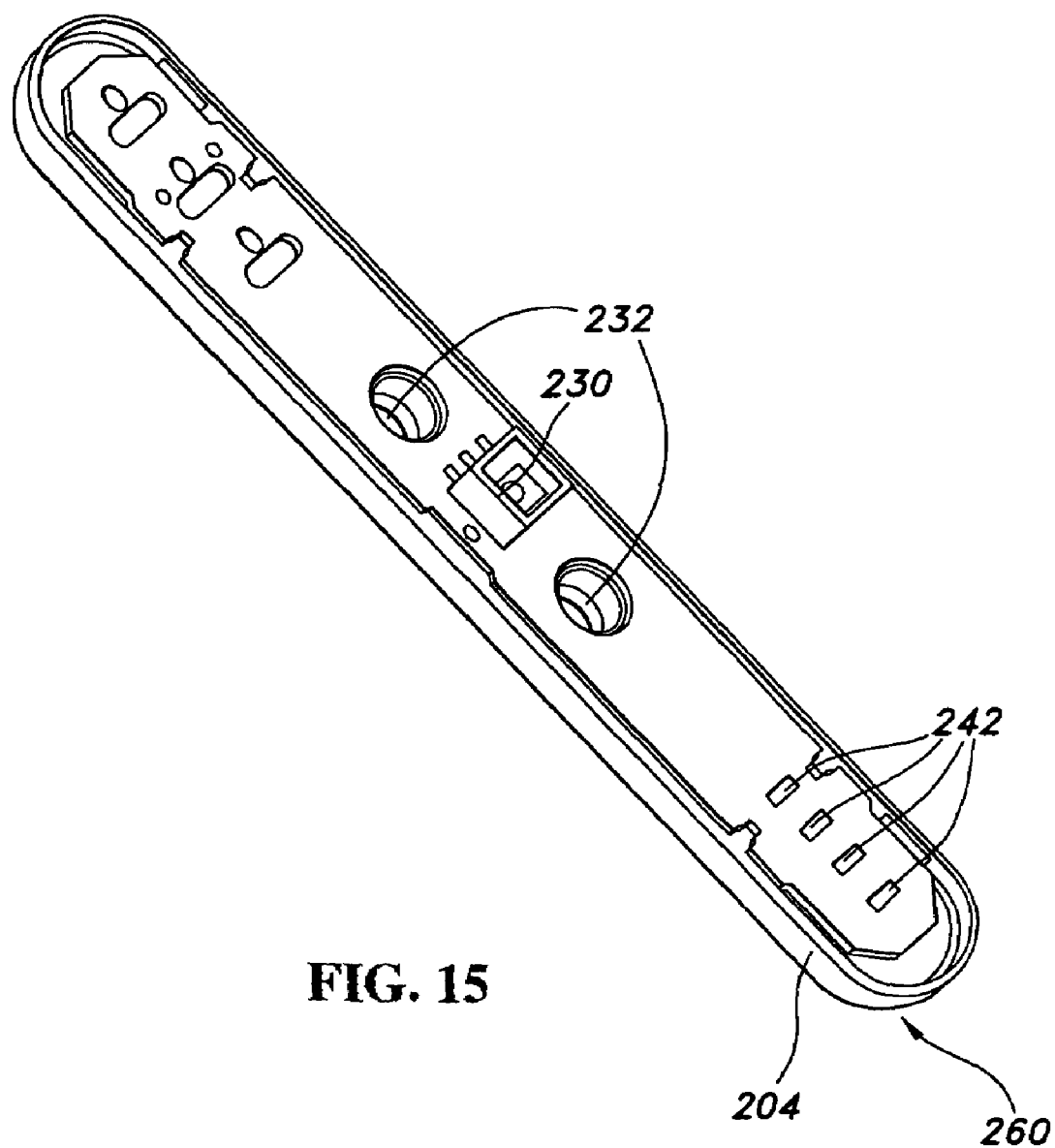
FIG. 15 is a front perspective view of the colorimeter of FIG. 14 with the light pipe and front cover removed.

The front and rear covers 202 and 204 enclose a PCB 212 disposed intermediate the light pipe 210 and rear cover 204 as best seen in FIG. 14. PCB 212 is a primary colorimeter PCB with sensors 220, 222, and 224 facing the source image (not shown) to make component readings of the luminance emanating from the source image. An ambient sensor 230 faces ambient light impinging on the surface of the source image. The ambient sensor 230 is a light tight package that receives the ambient light directed at the source image and impinging the lens 206 of light pipe 210. A pair of corresponding apertures 232 defined by PCB 212 allow corresponding light pipe cylinders 234 extending from light pipe 210 to extend therethrough to the rear cover 204. Each cylinder 234 is capped with a clear plastic lens 236 Each lens 236 and cylinder 234 allows passage of the light emitted from the source image to pass through the PCB 212 and direct the same to the ambient sensor 230 located on an opposite surface side of the PCB 212 where the three sensors 220, 222 and 224 are disposed.

A means to indicate the status of colorimeter 200 (e.g., calibration) or indicate a change in the ambient illumination may be disposed at an opposite end of the colorimeter from which the sensors 220, 222 and 224 are disposed. The indicating means 240 may include a plurality of LEDs or other display means known in the art to indicate a status or parameter. In an exemplary embodiment, four differently colored LEDs are indicated generally at 242. Depending on which of the differently colored LEDs are lit, one or more lit LEDs or a sequence thereof may indicate the status of calibration or re-calibration of colorimeter 200 and/or indicate that there has been a predetermined change in ambient illumination, for example. However, other parameters or status conditions may be indicated as well.

Figure 13:
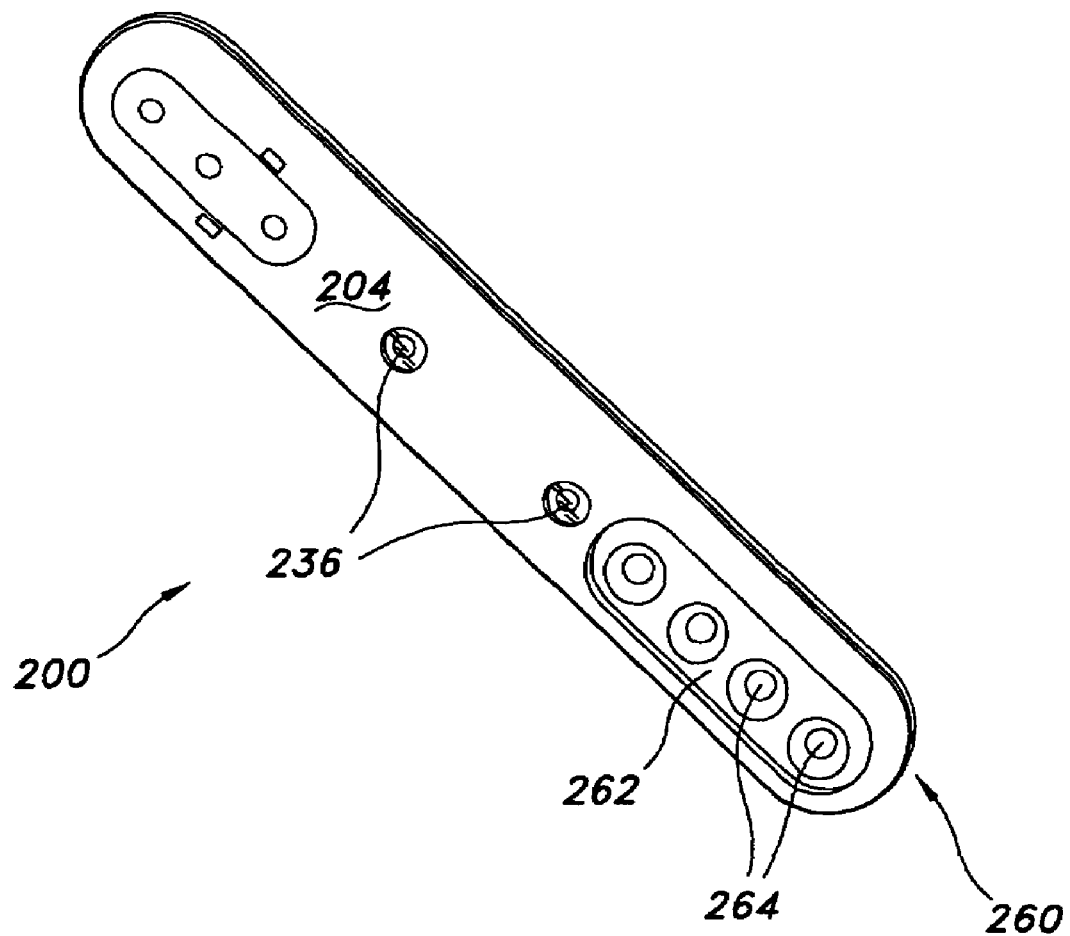
FIG. 13 is a rear perspective view of the colorimeter of FIG. 12, illustrating an external baffle with three apertures for receiving luminance emanating from the source image therethrough.
Figure 16:
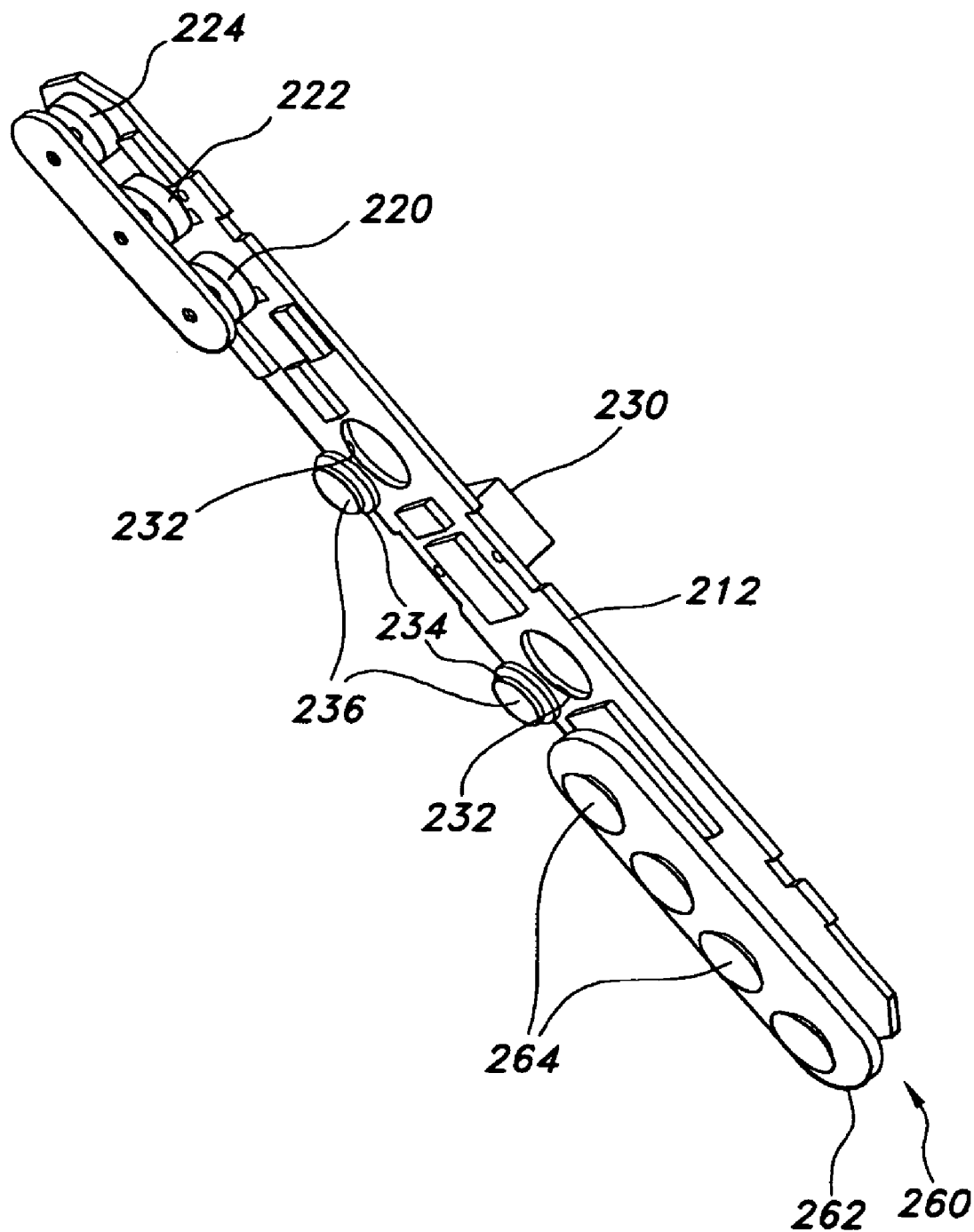
FIG. 16 is an exploded rear perspective view illustrating an orientation of sensors, chamber, orifices and PCB after removing front and rear covers and the light-pipe from the colorimeter shown in FIG. 15.

As best seen with reference to FIGS. 13 and 16, rear cover 204 is configured to receive an external baffle 250 having three apertures 252, 254 and 256 aligned with a respective sensor 220, 222 and 224. The external baffle 250 is illustrated as being substantially flush with a rear surface defining the rear cover 204, but other suitable configurations (e.g., recessed or raised from rear cover 204) are contemplated. The external baffle 250 further defines the field of view for sensors 220, 222 and 224. At an opposite end of the rear cover 204 indicated generally at 260, an attachment means 262 is exposed for attaching the colorimeter 200 to a display monitor (not shown). In an exemplary embodiment as depicted, the attachment means includes a plurality of suction cups (four shown) 264 for releasable attachment to the display surface of the monitor. As shown, the plurality of suction cups are serially aligned with respect to one another, however, other configurations are contemplated. Attachment means 262 may include any known releasable affixing device that allows the colorimeter to be attached to the image source without damage to the same.

Figure 17:
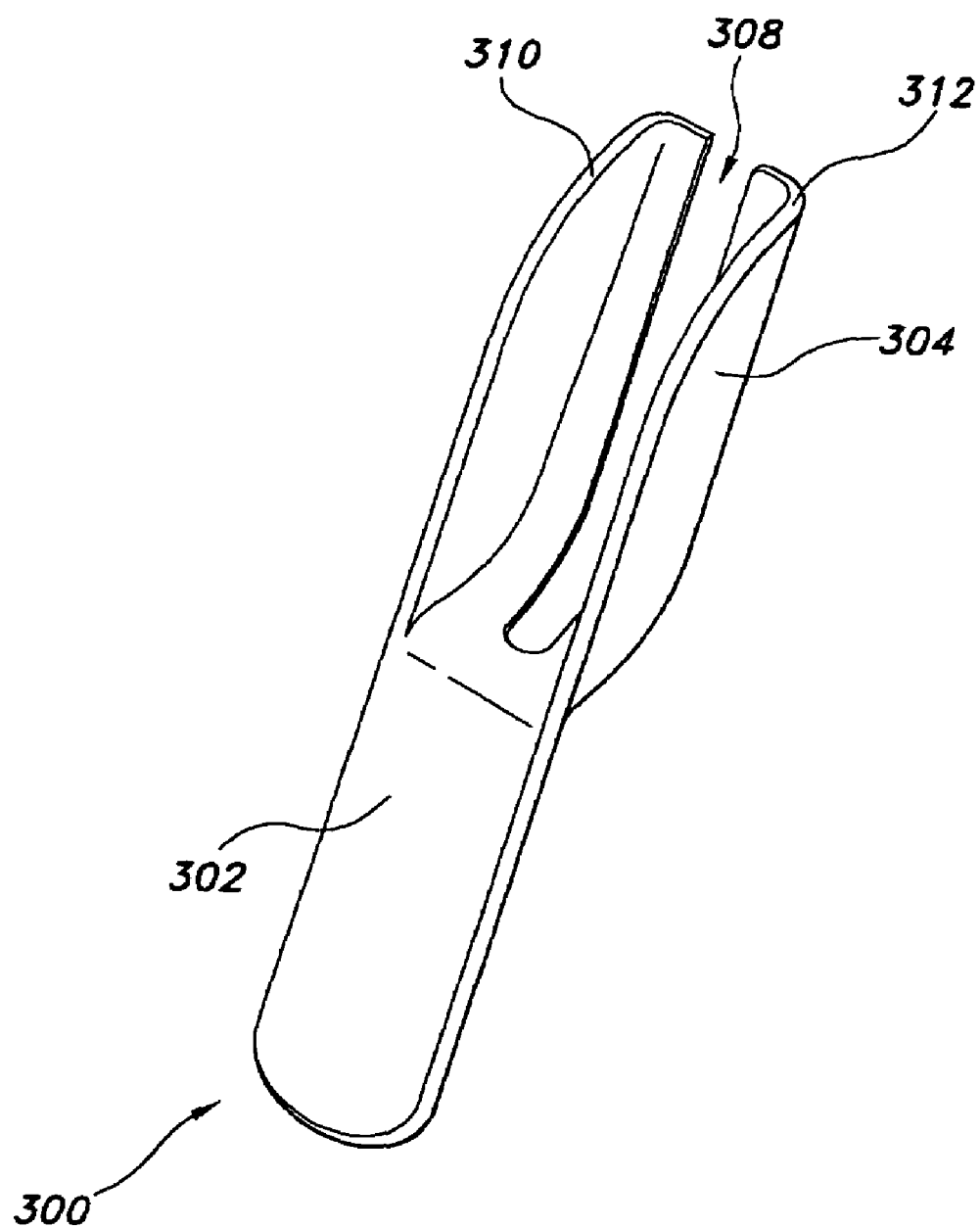
FIG. 17 is a front perspective view of a colorimeter housing that can be affixed to a monitor (other than on a display screen) to conveniently hold the colorimeter when not in use.
Figure 18:
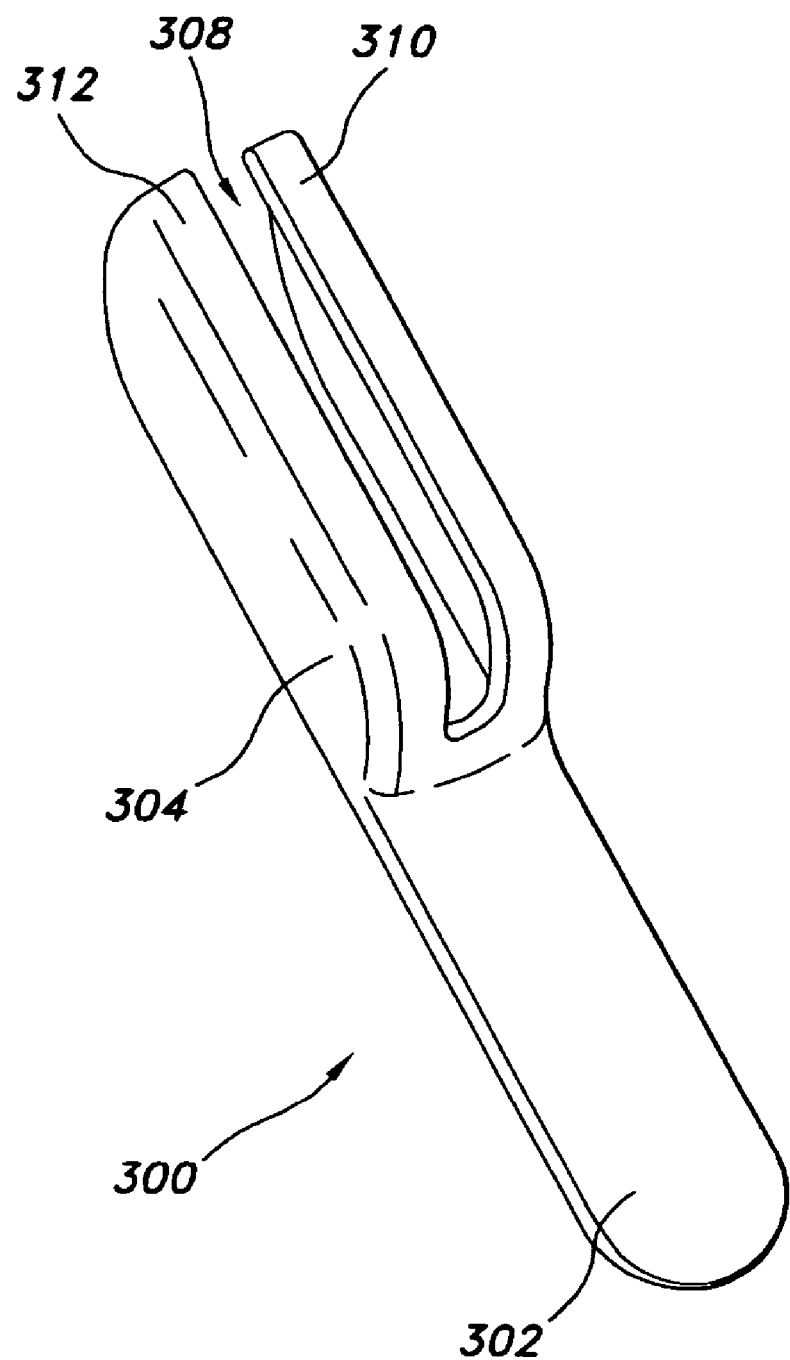
FIG. 18 is a rear perspective view of the colorimeter housing of FIG. 17.

Referring now to FIGS. 17 and 18, a housing 300 for holding the colorimeter of FIGS. 12-16 is illustrated. Housing 300 is configured to be affixable to the source image, for example a display monitor other than the display screen, when the colorimeter 200 is not in use. Housing 300 includes a first member 302 and a second member 304 extending from the first member 302. The first member 302 is substantially planar for providing a surface to be affixed to a monitor, for example. The second member 304 extending from the first member 302 is configured to receive at one of the two longitudinal ends defining the colorimeter 300. More specifically, second member 304 is contoured having a similar contour to the end 260 defined by the either the front or rear covers 202, 204, respectively. Further, the second member 304 includes a longitudinal groove 308 substantially bisecting the second member 304 into first and second portions 310 and 312, respectively. The first and second portions 310 and 312, respectively, then can be resiliently displaced relative to each other to releasably receive and secure the colorimeter 200 therewith when not in use. In addition, the plurality of serially aligned suction cups 264 disposed in the second member 304 may provide a tacky surface to provide releasable positive grip between the colorimeter 200 and housing 300.

Measuring the effects of ambient light impinging on a source image and correcting either statically, dynamically in real-time, or both provide significant further improvement to the ability of a colorimeter to provide optimum image processing. In particularly preferred embodiments of the present disclosure, a polynomial-based algorithm is used to generate appropriate corrections based on ambient conditions. Among the relative few low cost implementations of colorimeters, an improved colorimeter results from the present invention discussed herein seamlessly integrated with prior work performed by the applicants. Prior work includes development of software, firmware, algorithms and circuits (largely presented in U.S. Pat. No. 5,892,585 and in U.S. Patent Publication No. 2004/0114144. The result is to provide a significant improvement in accuracy, repeatability and other factors of effective colorimetry.

While the invention has been described with respect to specific exemplary embodiments set forth herein, those skilled in the art will readily appreciate that various modifications, changes, and enhancements may be made thereto without departing from the spirit or scope of the present invention. The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A system for implementing an appearance model correction for a display, comprising:
    (a) means for measuring illuminance associated with a display;
    (b) means for calculating a display correction based at least in part on the measured illuminance using a polynomial-based algorithm, and
    (c) means for implementing the calculated display correction on the display.

2. A system according to claim 1, wherein the display is selected from the group consisting of a CRT and an LCD.

3. A system according to claim 1, wherein the means for measuring illuminance comprises an ambient light sensor.

4. A system according to claim 1, wherein the means for calculating a display correction is a processing unit that is programmed with said polynomial-based algorithm.

5. A system according to claim 4, wherein the programming of the processing unit is effected in software or hardware.

6. A system according to claim 1, wherein the implementation of the calculated display correction is automatically effected in real time.

7. A system according to claim 1, wherein the polynomial-based algorithm calculates the display correction based on the zero ambient gamma value for the display and ambient illuminance.

8. A method for correcting a display, comprising:
    (a) measuring illuminance associated with a display;
    (b) calculating a display correction based at least in part on the measured illuminance using a polynomial-based algorithm;
    (c) implementing the calculated display correction on the display.

9. A method according to claim 8, wherein the illuminance is measured using an ambient light sensor.

10. A method according to claim 8, wherein calculation of the display correction is effected using programming embodied in software or hardware.

11. A color sensing device, comprising:
    a chamber block having at least three overlapping spectral light passages extending through the chamber block configured to select a preferred field of view between a target surface and a corresponding sensor adapted to detect light from the target surface, each light passage comprising:
        an entry orifice facing the target surface, the entry orifice defined with an entry wall defining an entrance for emitted light from the target surface into the light passage;

an exit orifice facing the sensor, the exit orifice defined with an exit wall defining an exit for the emitted light from the light passage; and a chamber intermediate the entry and exit walls, the chamber defined by a chamber wall having a diameter larger than a diameter of the entry and exit walls; and a processing unit adapted to calculate a display correction based at least in part on measured illuminance associated the target surface using a polynomial-based algorithm.

12. The color sensing device of claim 11, wherein at least one of the entry and exit walls forms a frustoconical orifice.

13. The color sensing device of claim 12, wherein the entry orifice is defined with an entry opening to the chamber block having a diameter smaller than a first opening to the chamber.

14. The color sensing device of claim 12, wherein the exit orifice is defined with an exit opening to the chamber block having a diameter larger than a second opening to the chamber.

15. The color sensing device of claim 12, wherein the entry orifice is defined with an entry opening to the chamber block having a diameter smaller than a first opening to the chamber and the exit orifice is defined with an exit opening to the chamber block having a diameter larger than a second opening to the chamber, the first and second openings defining opposite openings of the chamber connected to the entry and exit walls, respectively.

16. The color sensing device of claim 15, wherein a diameter of the entry opening to the block is smaller than a diameter of the exit opening to the block.

17. The color sensing device of claim 11, wherein the chamber wall is cylindrical.

18. The color sensing device of claim 11, wherein the chamber block is a two part separable chamber block.

19. The color sensing device of claim 11, further comprising a baffle having an aperture aligned with the light passage of the block, the baffle being disposed at least at one of inside the chamber and outside the chamber in proximity of the entry or exit orifices to eliminate or minimize extraneous light rays that might reach the sensor and degrade the signal-to-noise ratio.

20. The color sensing device of claim 19, wherein the baffle is disposed outside the block and spaced from a respective corresponding entry or exit orifice.

21. The color sensing device of claim 19, wherein the baffle disposed inside the chamber defines the aperture thereof by countersinking opposite surfaces defining the baffle.

22. The color sensing device of claim 11, wherein the target surface includes one of a LCD display, a CRT display or a flat panel display.

23. The color sensing device of claim 11, further comprising an ambient light sensor associated with the first housing facing ambient light impinging the target surface, wherein the ambient sensor continuously reads the impinging light while the three or more light sensors simultaneously read the light attributes emanating from the target surface.

24. The color sensing device of claim 23, wherein the ambient light sensor faces the impinging ambient light and the three or more light sensors face the target image allowing for simultaneous reading of the target image attributes and the impinging ambient light with the first housing is in a fixed position relative to the target image.

25. The color sensing device of claim 11, further comprising a feedback means for providing feedback to a user indicative of when re-calibration or other operation is being performed by the color sensing device or when there is a predetermined change in measurement of the impinging ambient light.

* * * * *